(12) United States Patent
Hillis

(10) Patent No.: US 6,408,885 B2
(45) Date of Patent: Jun. 25, 2002

(54) STAKED DUAL VALVE ASSEMBLY

(75) Inventor: William L. Hillis, Lawrenceburg, TN (US)

(73) Assignee: Lincoln Brass Works, Inc., Hendersonville, TN (US)

( * ) Notice: Subject to any disclaimer, the term of this patent is extended or adjusted under 35 U.S.C. 154(b) by 0 days.

(21) Appl. No.: 09/784,753

(22) Filed: Feb. 15, 2001

Related U.S. Application Data

(63) Continuation of application No. 09/232,547, filed on Jan. 18, 1999, now Pat. No. 6,199,589.

(51) Int. Cl.⁷ ............................................. F16K 27/00
(52) U.S. Cl. ..................... 137/883; 251/151; 285/330; 285/382
(58) Field of Search ................. 137/883, 884, 137/887; 251/151, 152; 285/382, 330

(56) References Cited

U.S. PATENT DOCUMENTS

| | | |
|---|---|---|
| 144,565 A | 11/1873 | Roos |
| 212,611 A | 2/1879 | Linnell |
| 1,123,189 A * | 12/1914 | Hannaford .................. 137/883 |
| 1,366,591 A | 1/1921 | Passano |
| 1,393,908 A * | 10/1921 | Rudolph ...................... 251/151 |
| 1,487,389 A | 3/1924 | King |
| 1,677,740 A * | 7/1928 | Weatherhead, Jr. ......... 251/151 |
| 1,776,615 A | 9/1930 | Boothman |
| 1,858,136 A | 5/1932 | Brenner |
| 1,998,830 A * | 4/1935 | Beebe ......................... 137/883 |
| 2,029,325 A | 2/1936 | Koeher |
| 2,083,088 A | 6/1937 | Pratt et al. |
| 2,165,621 A | 7/1939 | Donahue et al. |
| 2,343,755 A | 3/1944 | Dougherty |
| 2,438,530 A | 3/1948 | Woodling |
| 2,500,720 A | 3/1950 | Van Der Heem |
| 2,543,087 A | 2/1951 | Woodling |
| 2,553,342 A | 5/1951 | Trageser |
| 2,626,634 A * | 1/1953 | McDowell ................... 137/883 |
| 3,188,733 A | 6/1965 | Rickard |
| 3,378,282 A | 4/1968 | Demler |
| 3,787,945 A | 1/1974 | Pasek et al. |
| 3,788,344 A | 1/1974 | Dyck |
| 4,103,937 A | 8/1978 | Wakefield |
| 4,126,929 A | 11/1978 | Ridenour |
| 4,200,314 A | 4/1980 | Ridenour |
| 4,330,144 A | 5/1982 | Ridenour |
| 4,357,990 A | 11/1982 | Melnyk |
| 4,363,337 A | 12/1982 | Pease |
| 4,420,022 A | 12/1983 | Landry |
| 4,469,356 A | 9/1984 | Duret et al. |
| 4,575,134 A | 3/1986 | Sugano |
| 4,616,855 A | 10/1986 | Ruhle |
| 4,665,960 A * | 5/1987 | Brzezicki ..................... 251/142 |
| 4,776,616 A | 10/1988 | Umehara et al. |
| 5,007,667 A | 4/1991 | Unewise et al. |
| 5,054,822 A | 10/1991 | McGushion |

(List continued on next page.)

FOREIGN PATENT DOCUMENTS

| | | |
|---|---|---|
| DE | 42 01 799 A1 | 7/1993 |
| EP | 0 276 483 | 12/1987 |
| GB | 0547358 | 8/1942 |
| GB | 688579 | 12/1951 |
| IT | 410268 | 4/1947 |

*Primary Examiner*—William C. Doerrler
*Assistant Examiner*—John Bastianelli
(74) *Attorney, Agent, or Firm*—Harness, Dickey & Pierce, P.L.C.

(57) ABSTRACT

A gas valve assembly for use with a gas grill includes a t-shaped manifold with an inlet fluid port that branches out into a pair of valve ports. A pair of gas valves each have an outwardly extending neck that is received within the valve ports of the manifold. A stop means locates the valves a predetermined distance from one another to improve manufacturability. An anti-rotation means minimizes rotation between each valve and the manifold.

23 Claims, 3 Drawing Sheets

U.S. PATENT DOCUMENTS

| | | |
|---|---|---|
| 5,066,051 A | 11/1991 | Weigl et al. |
| 5,078,433 A | 1/1992 | Morse et al. |
| 5,090,743 A | 2/1992 | Obering |
| 5,361,802 A | 11/1994 | Kroll et al. |
| 5,573,285 A | 11/1996 | Ridenour |
| 5,769,465 A | 6/1998 | Schultz et al. |
| 5,803,511 A | 9/1998 | Bassette |
| 5,833,280 A | 11/1998 | Ferlin et al. |

* cited by examiner

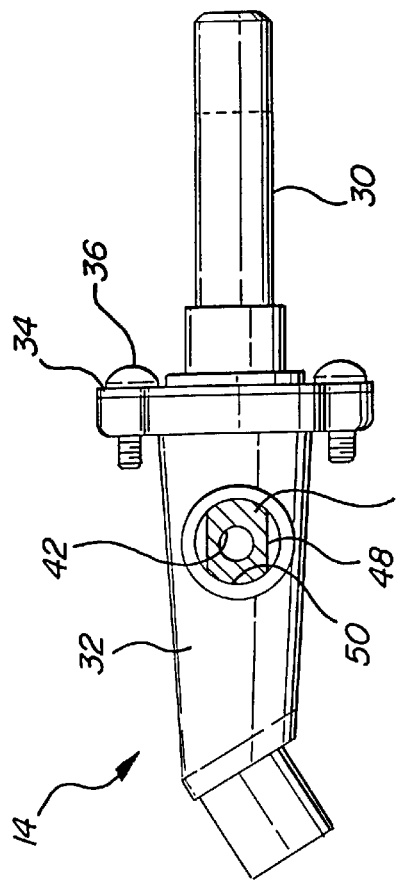
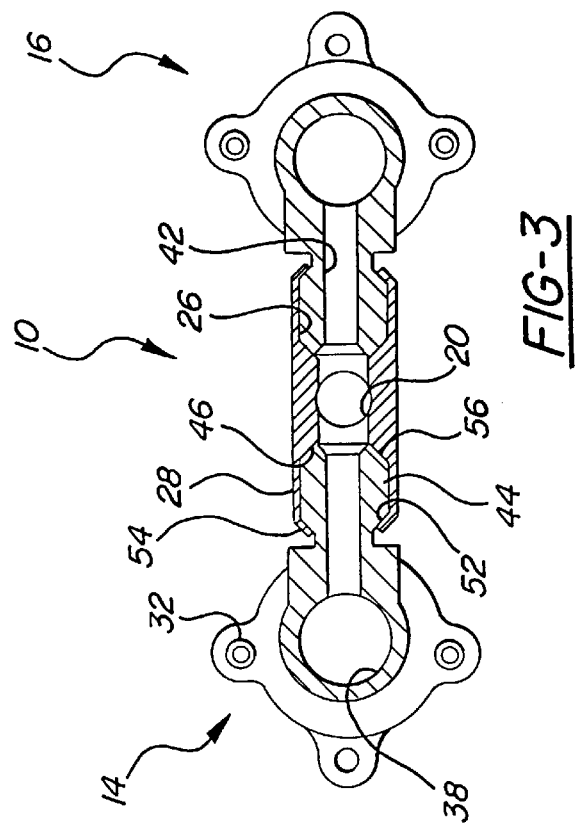
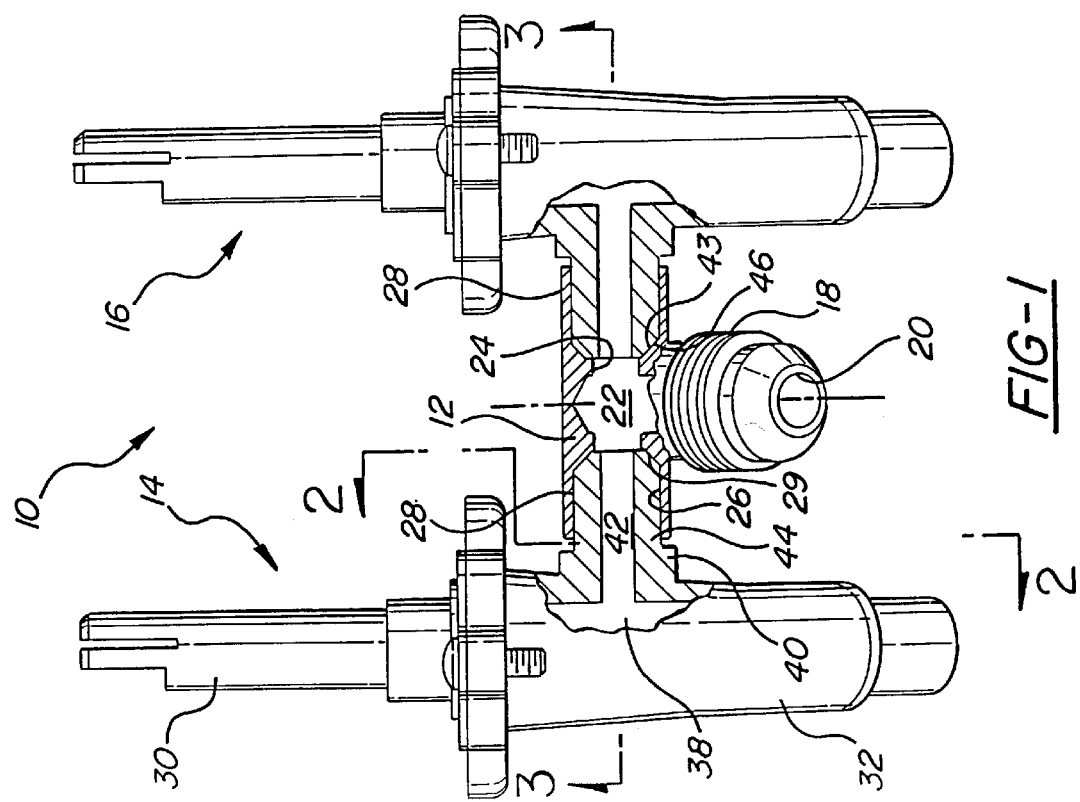

STAKED DUAL VALVE ASSEMBLY

CROSS REFERENCE TO RELATED APPLICATIONS

This application is a continuation of U.S. patent application Ser. No. 09/232,547 filed on Jan. 18, 1999, now U.S. Pat. No. 6,199,589 the disclosure of which is incorporated herein by reference.

FIELD OF THE INVENTION

The present invention relates generally to a fluid fitting assembly, and more particularly, to a staked dual valve and manifold system.

BACKGROUND AND SUMMARY OF THE INVENTION

Contemporary outdoor gas grills often utilize dual gas burners that are controlled by a common dual gas valve assembly. A typical dual gas valve assembly has a single feed supply line that delivers gas to a pair of valves which in turn selectively supplies gas to the individual burners in the gas grill. Conventional methods of connecting the gas supply line to the valves include using a manifold fitting with a plurality of ports. The ports are often threaded internally or externally, in order to enhance connectability of the gas inlet line and the valves.

The problem with conventional threaded pipe connections is that they are slow to assemble in a high-speed manufacturing environment. Further, they require additional manufacturing steps including cutting threads, either internally or externally, into the fitting or the manifold. Also, the pipe or member that is to be connected to the manifold must be threaded. Such designs increase the per unit cost and require special machines for production.

Other problems with conventional threaded pipe connections for gas valve assemblies is the difficulty of obtaining the proper alignment of the two valves relative to the face plate of the gas grill. Typical face plates for gas grills include prepunched holes that allow the valve stems to extend therethrough. Thus, the valve stems must be concentric with the prepunched holes in the face plate. Failure to maintain such alignment creates a visually displeasing appearance. It has been problematic to maintain the distal relationship between the valve stems when the gas manifold assembly is threaded. This in part because the angular displacement caused by threading the parts together creates a variable in the manufacturing process. It is preferred to remove this variable from the manufacturing process in order to improve product quality. This can be accomplished in part by maintaining the distal relationship of the center line of each valve stem by creating a stop between the valves and the manifold.

Therefore, there is a need to provide a dual gas valve assembly that either eliminates or minimizes the number of threaded connections, has enhanced manufacturability, can be formed in a minimal number of steps, can be mass produced, yet still produce a gas tight connection by way of a threadless mechanical stake. There is also a need for an assembly that has an alignment feature for promptly and accurately joining a valve to a manifold in high speed manufacturing environments.

Accordingly, it is an object of the present invention to provide a dual valve and manifold system that overcomes the problems mentioned above. Such a manifold system should be simple in design, minimize the number of operations required by an operator to create such an assembly, and minimize the number of tools that are required to perform such an operation while still being capable of providing a mechanical joint with significant joint integrity.

One of the preferred forms of the present invention provides as one of its aspects, a fitting having a fluid delivery bore connected to a central chamber, a first elongated section extending from the central chamber, a second elongated section extending from the central chamber, and a crimped portion located at an end of the elongated sections for securing the fitting to first and second control valves. A first control valve has a main body with a central fluid passage. The first control valve further has an outwardly extending member with an internal fluid passage. A second control valve with a main body has a central fluid passage. The second valve further has a member with an internal fluid passage and a member which extends outwardly from the main body.

For a more complete understanding of the dual valve assembly, reference is made to the following detailed description and accompanying drawings in which the presently preferred embodiments of the invention are illustrated by way of example. Because the invention may take on several forms without departing from the spirit or essential characteristics thereof, it is expressly understood that the drawings are for purposes of illustration and description only, and are not intended as a definition of the limits of the invention. Throughout the following description and drawings, identical reference numbers refer to the same component throughout the several views.

BRIEF DESCRIPTION OF THE DRAWINGS

FIG. 1 is a top view of the present invention illustrating a T-shaped manifold connecting two valves;

FIG. 2 is a side elevational view looking along lines 2—2 of FIG. 1, illustrating the flattened portion of the valve that extends into the manifold;

FIG. 3 is a sectional view looking along lines 3—3 of FIG. 1, illustrating the manifold crimped to portions of the valves;

DETAILED DESCRIPTION OF THE PREFERRED EMBODIMENTS

Figure 4:
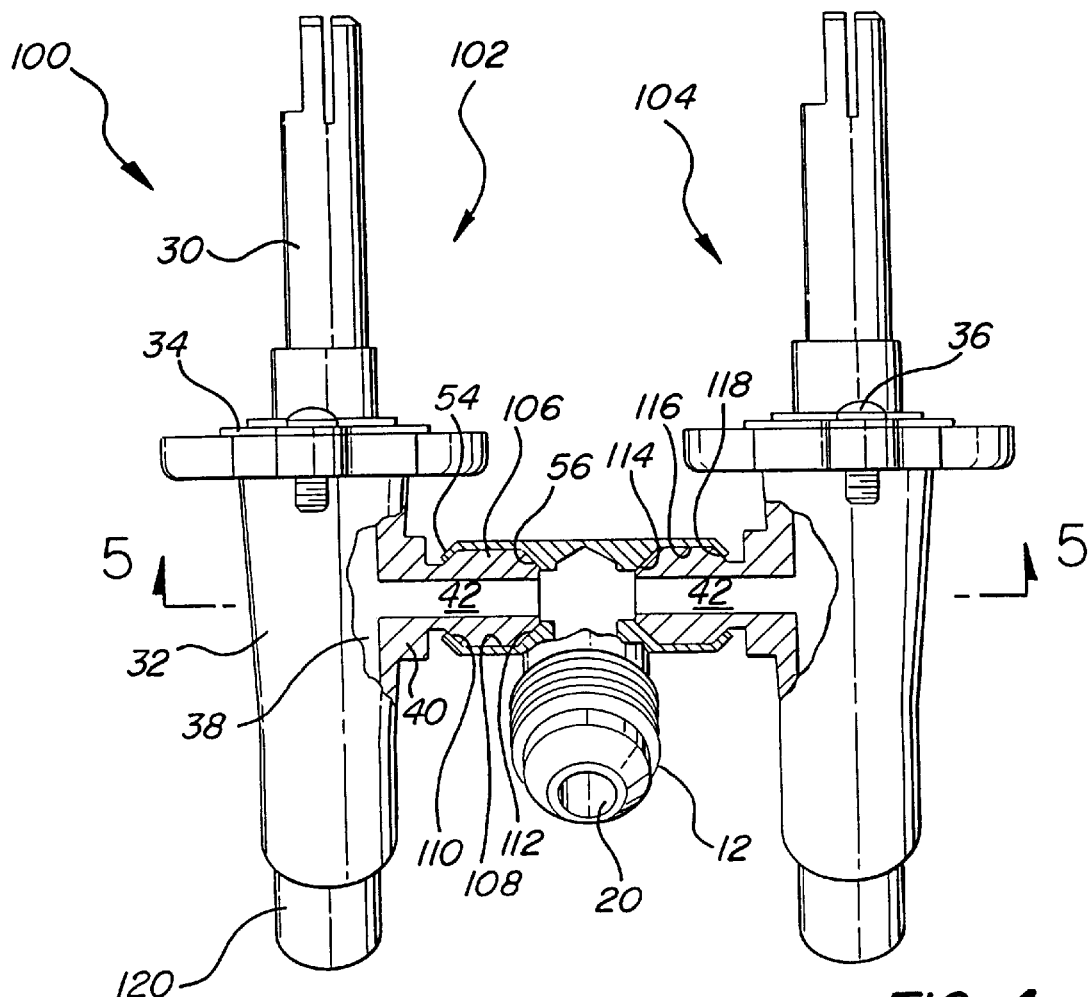
FIG. 4 is an alternative embodiment of the present invention, illustrating the manifold crimped to the valve.

A dual gas valve assembly 10 is shown in FIGS. 1 through 3. The valve assembly 10 is comprised of a manifold 12 and a pair of control valves 14 and 16. FIG. 1 illustrates these components with sections of the valves broken away to illustrate the connection between the manifold 12 and the control valves 14 and 16.

The manifold 12 is preferably T-shaped and is made of malleable metal in order to allow it to deform as needed. An inlet side of the manifold 12 has external threads 18 and an internal fluid delivery passageway 20. A central chamber 22 delivers fluid, such as gas, to a large bore 24 and into a pair of fluid passages 26. The fluid passages 26 are defined in part by a pair of outwardly extending elongated members 28 which extend in a direction that is normal to the inlet 20. The manifold 12 is symmetrical about a center axis which extends through inlet 20. Each fluid passage 26 has a chamfered corner 29.

Each control valve 14 and 16 is of the same construction and thus only a discussion of control valve 14 will follow. With reference to FIGS. 1 through 3, control valve 14 includes a valve stem 30, a main body 32 and a cover plate 34 that clamps the valve stem 30 to the main body 32 via fasteners 36. The main body 32 has a longitudinally extending fluid passage 38 and an outwardly extending member 40 having a fluid passage 42. The outwardly extending member 40 is preferably a continuous extension of the main body 32, both of which are preferably made of metal by casting or forging. The member 40 has a neck 44 and a shoulder 46 that mates with the chamfered edge 29 to create a stop 43 and seat. This self aligning feature allows the valve 14 to be located relative to the manifold 12 in a precise position very fast compared to conventional threaded methods of assembly. When both valves 14 and 16 are assembled together with the manifold 12, the valves are located at a predetermined distal relationship to one another. This will ensure that the valve stems are properly centered within the holes in the face plate of the gas grill.

As shown in FIGS. 2 and 3, a portion of the neck 44 has flattened sections 48 and a semi-circular section 50 with the fluid passage 42 extending therethrough. The flattened section 48 provides an anti-rotation feature to minimize rotation of the control valve 14 relative to the manifold 12. Rotation of the valve relative to the manifold is further minimized by displacing a portion of the fitting within a recess 52 in the control valve 14 near the flattened section 48. This is accomplished in part by the ends 54 of the elongated members 28 being crimped which also forms a tight seal between the manifold 12 and the control valve 14. The crimping action further forces the end 46 of the valve against the shoulder 56 of the manifold. Thus, a plurality of seals are created by virtue of this gas valve assembly.

Figure 5:
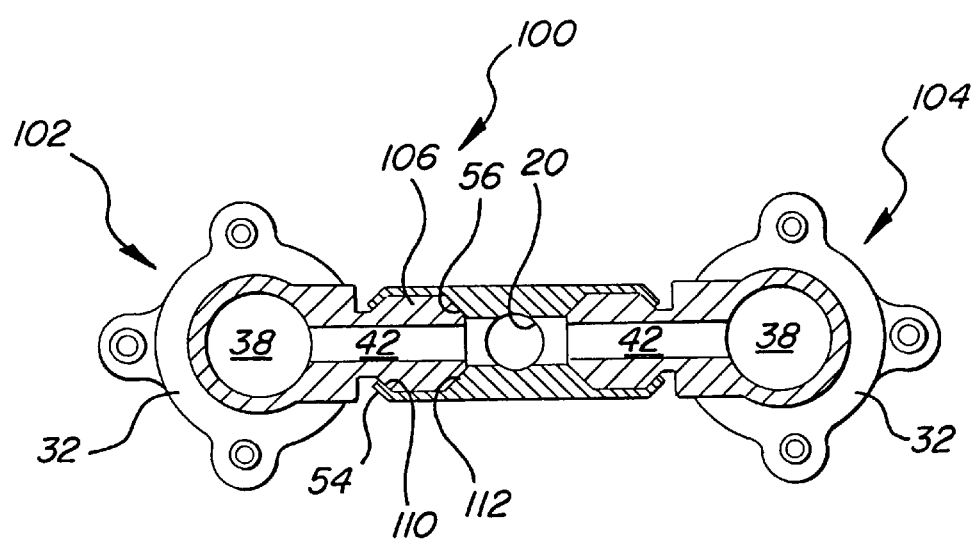
FIG. 5 is a sectional view looking along the lines 5—5 of FIG. 4, illustrating the connection between the manifold and the valves.

With reference to FIGS. 4 and 5, an alternative embodiment gas valve assembly 100 is illustrated. The primary difference between the gas valve assembly 100 and the gas valve assembly 10 as shown in FIG. 1 is that the alternative assembly 100 does not have a flattened neck extending from the valve body. Instead, the neck is substantially in circular form and is crimped around its entire perimeter by the ends of the manifold.

The primary components of the gas valve assembly 100 includes the T-shaped manifold 12 and a pair of control valves 102 and 104. The control valves are similar in configuration and thus only a discussion of control valve 102 will be presented. Control valve 102 includes a valve stem 30, a main body 32, a cover 34, and a pair of fasteners 36. The main body has a central fluid passage 38 and an outwardly extending member 40 at a substantially right angle to the fluid passage. The configuration of the neck 106 is substantially circular in cross section and is elongated with a smooth exterior surface 108. The neck 106 further has a first shoulder 110 and a second shoulder 112 at distal ends. When assembled, the shoulder 112 abuts against shoulder 56 of the manifold to create a seal therebetween once the end 54 is crimped. The crimped end 54 extends around the entire circumference of the first shoulder 110 which acts as a securing means to lock together the manifold 12 and the control valve 102. The resulting assembly creates seals 114,116 and 118.

During operation, fluid enters inlet passageway 20, then flows to central chamber 22, is then split bi-directionally into fluid passages 42 and is finally directed into the fluid chamber or passage 38 of the valves 102 and 104. Gas then exits out of the control valve at outlet 120. The rate of flow of gas through the control valve 102 is controlled in part by adjusting the arm 30 and its inter-connected components (not disclosed herein).

Figure 6:
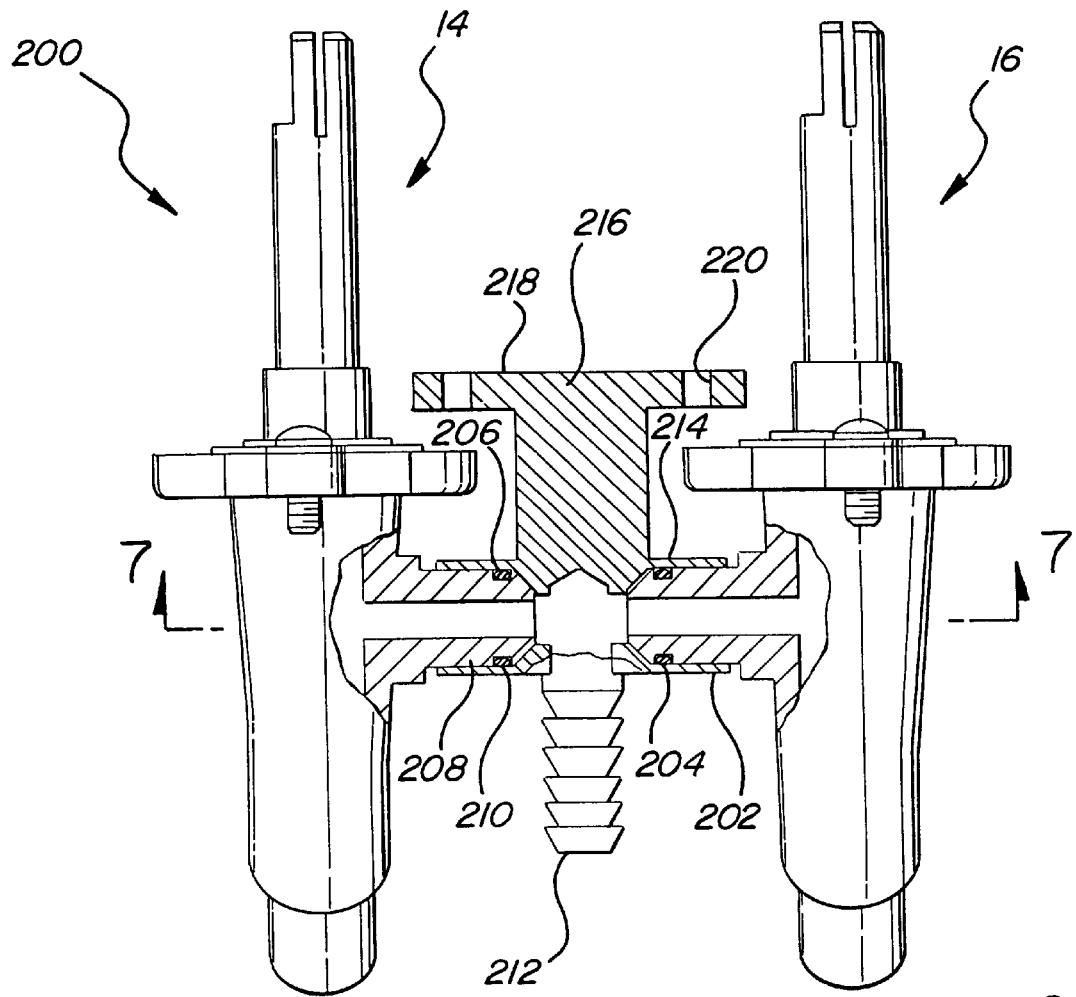
FIG. 6 is yet another alternative embodiment of the present invention, illustrating a seal between the manifold and the valves and a mounting pad.
Figure 7:
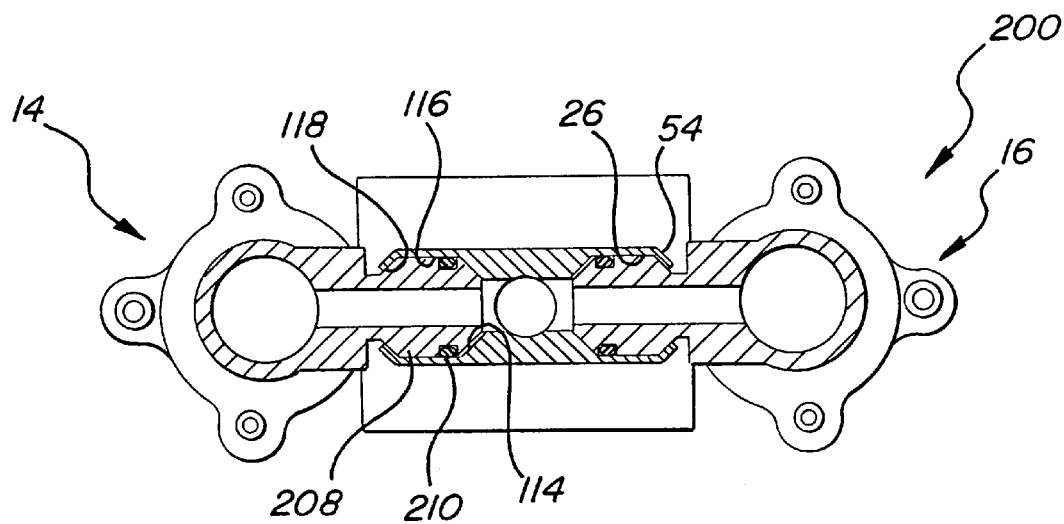
FIG. 7 is a sectional view looking along lines 7—7 of FIG. 6, illustrating the manifold and valve connection.

With reference to FIGS. 6 and 7, a second alternative embodiment gas valve and manifold assembly 200 is disclosed which employs many of the components of the FIG. 1 dual valve gas assembly 10. However, an O-ring has been added to provide an extra seal and the fitting now has a mounting pad. It will be appreciated that the embodiments depicted in FIGS. 1–5 could include this unique seal and mounting pad. The gas valve assembly 200 includes control valves 14 and 16, a manifold fitting 202 with a mounting pad and an O-ring 204. The control valves 14 and 16 are essentially the same construction and thus only discussion of control valve 14 will be presented.

Control valve 14 includes a groove 206 near the outer end of the neck 208. The O-ring 204 is seated within the groove 206 and provides yet a fourth additional seal 210 between the manifold fitting 202 and the valve assembly. The outer ends 54 of the fitting 202 are crimped to encapsulate the neck within the passage 26. Thus, seals 114, 116, 118 and 210 are created once the assembly 200 is completed. The gas valve assembly 200 further employs the same anti-rotation feature because the neck 208 has the same flattened section 48 and semi-circular section 50 as disclosed in FIG. 2.

The fitting 202 has an inlet 212 with an exterior having a hose barb type configuration, a pair of outwardly extending members 214 and a mounting pad 216. The mounting pad 216 extends outwardly from the members 214 and has a flattened surface 218 with a pair of holes 220 for securing the assembly 200 to a front panel on a gas grill. It will be appreciated that the fitting can be configured differently to accommodate various types of mounting arrangements.

It will also be appreciated that other configurations of the anti-rotation components are permissibly within the scope of this invention. The configuration illustrated in FIG. 2 is exemplary in nature and is not intended to limit the scope of this invention.

What is claimed is:

1. A valve and manifold assembly for use with a gas grill, the assembly comprising:

a manifold having an inlet member and a pair of integral outwardly extending valve ports, each valve port having an internal surface with a first beveled shoulder; and a first one-piece valve having a body and an integral neck, the neck fitting into the manifold and having a flattened extended portion that extends substantially within and sealingly engaging a flat portion of one of the valve ports, the body having an internal fluid passage, a longitudinal axis extending through the internal fluid passage, the neck extending normal to the longitudinal axis and the flatten extended portion sealingly engaging a substantial portion of the internal surface of one of the valve ports of the manifold.

2. The assembly as claimed in claim 1, further comprising a second one-piece valve having a body with a longitudinal axis extending through the body, a neck is formed integral with the body, the neck extending normal to the longitudinal axis, the neck having a non-circular portion with an exterior surface for sealingly engaging the interior surface of the other valve port of the manifold.

3. The assembly as claimed in claim 2, further comprising a positive stop for maintaining a constant distance between the longitudinal axis of the first valve and the longitudinal axis of the second valve.

4. The assembly as claimed in claim 1, wherein the integral outwardly extending valve ports of the manifold are crimped around the neck.

5. The assembly as claimed in claim 1, wherein the manifold and the valve are secured together by a threadless connection.

6. The assembly as claimed in claim 1, further comprising a seal disposed between the valve and the manifold.

7. The assembly as claimed in claim 1, wherein the neck is located substantially within the valve port.

8. A gas valve assembly comprising:

a one-piece t-shaped gas manifold having a main chamber with a pair of valve ports, each valve port having an internal surface, and an inlet member extending away from the main chamber for directing gas into the main chamber;

a first valve having a body, a first longitudinal axis extending through the body, and a neck extending normal to the axis, the neck is formed with the body making the body and neck fixed relative to one another, the neck having first portion adjacent to the body, the first portion is circular in cross-section, the neck further having a second portion of non-circular cross-section that is smaller in cross-section than the first portion, the second portion having an exterior surface that is substantially received within and sealingly engages a majority of one of the valve ports of the manifold.

9. The assembly as claimed in claim 8, wherein the neck of each valve has a non-circular portion that engages the manifold to prevent relative rotation therebetween.

10. The assembly as claimed in claim 8, wherein each neck is located substantially within a valve port of the manifold.

11. The assembly as claimed in claim 8, further comprising a means for securing the manifold to each valve.

12. The assembly as claimed in claim 8, further comprising a stop means for maintaining a constant space between the first longitudinal axis and the second longitudinal axis.

13. A dual gas valve and manifold assembly comprising:

a first valve having a body with a first longitudinal axis extending through the body and an outwardly extending portion protruding at a right angle from the first longitudinal axis, the outwardly extending portion having a circular section near the body with a first diameter, the outwardly extending portion further having a second portion with a second diameter that is non-circular and is less than the first diameter, the second portion being operable to sealingly engage an internal port of a manifold;

a second valve having a body and an outwardly extending portion;

a the manifold is one-piece integral t-shaped manifold with a valve port located on opposite ends of the manifold, and an inlet member extending away from each valve port, each valve port having a beveled internal shoulder and an internal surface, each outwardly extending portion of each valve is received substantially within one of said valve ports.

14. A valve assembly comprising:

a t-shaped gas manifold having a main chamber with a pair of ports, each port having an internal surface, and an inlet member extending away from the main chamber for directing gas into the main chamber; and a pair of valves, each valve having a body, a longitudinal axis extending through the body, a valve stem extending along a same plane as the longitudinal axis, a cover plate operable to receive the valve stem, fasteners for securing the cover plate to the body, and a neck extending normal to the axis, each neck being integrally formed with the body making the body and neck fixed relative to one another, each neck having an extended portion with a shoulder located at one end of the neck, each extended portion having a circular section and a non-circular section, the non-circular section received substantially within one of the ports of the manifold and sealingly engaging one of the internal surfaces of the port.

15. The assembly as claimed in claim 14, wherein the valve stem of each valve is offset a fixed distance from one another along the same plane.

16. The assembly as claimed in claim 14, wherein the internal surface of each port has a first beveled shoulder and the neck has a second beveled shoulder, said shoulders sealingly engaging one another.

17. The assembly as claimed in claim 14, wherein the inlet member of the manifold is a hose barb configuration.

18. The assembly as claimed in claim 14, wherein each port has outer ends that are crimped around the neck to secure the valve and manifold together.

19. The assembly as claimed in claim 14, wherein the extended portion of each neck is secured to the internal surface of the port.

20. The assembly as claimed in claim 14, wherein the neck is located substantially within the port of the manifold.

21. The assembly as claimed in claim 14, wherein each neck has a non-circular section that engages the internal surface of the port of the manifold.

22. The assembly as claimed in claim 14, wherein each valve has an anti-rotation means for preventing rotation of the manifold relative to the valves.

23. The assembly as claimed in claim 14, further comprising a seal located between the valve and the manifold.

* * * * *

UNITED STATES PATENT AND TRADEMARK OFFICE
CERTIFICATE OF CORRECTION

PATENT NO. : 6,408,885 B2
DATED : June 25, 2002
INVENTOR(S) : William L. Hillis

It is certified that error appears in the above-identified patent and that said Letters Patent is hereby corrected as shown below:

<u>Title page,</u>
Item [57], ABSTRACT,
Line 2, "t-shaped" should be -- T-shaped --.

<u>Column 4,</u>
Line 56, "flatten" should be -- flattened --.

<u>Column 5,</u>
Line 14, "t-shaped" should be -- T-shaped --.
Line 23, after "having" insert -- a --.
Line 29, after "manifold" delete "." and insert -- ; and -- then new paragraph and add -- a second valve having a body --.
Line 54, after "portion;" insert -- and --.

<u>Column 6,</u>
Line 1, delete "a" at the beginning of the paragraph.
Line 1, after "is" insert -- a --.
Line 1, "t-shaped" should be -- T-shaped --.
Line 10, "t-shaped" should be -- T-shaped --.

Signed and Sealed this

Twenty-fourth Day of December, 2002

JAMES E. ROGAN
*Director of the United States Patent and Trademark Office*